United States Patent [19]

Lohr, Jr. et al.

[11] 3,852,229

[45] Dec. 3, 1974

[54] STABILIZATION OF POLYBUTADIENE RESIN

[75] Inventors: Delmar F. Lohr, Jr.; Edward L. Kay, both of Akron, Ohio

[73] Assignee: The Firestone Tire & Rubber Company, Akron, Ohio

[22] Filed: Aug. 31, 1973

[21] Appl. No.: 393,516

[52] U.S. Cl.. 260/23.7 M, 260/23.7 R, 260/41.5 A, 260/45.7 PS, 260/799
[51] Int. Cl............................................. C08c 11/72
[58] Field of Search ........ 260/45.7 PS, 799, 23.7 R, 260/41.5 A, 23.7 M

[56] References Cited

UNITED STATES PATENTS

| | | | |
|---|---|---|---|
| 3,012,004 | 12/1961 | Baker | 260/45.7 PS |
| 3,635,934 | 1/1972 | Schaffhauser et al. | 260/45.7 PS |

Primary Examiner—Melvyn I. Marquis

[57] ABSTRACT

The incorporation of a bis(dihydrocarbylthionophosphonato) polysulfide into a polybutadiene resin greatly enhances the resistance thereof to thermo-oxidative deterioration.

7 Claims, No Drawings

STABILIZATION OF POLYBUTADIENE RESIN

This invention relates to butadiene polymer and copolymer resins, and more particularly to increasing the resistance of such resins to thermo-oxidative deterioration of the mechanical properties.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable.

Accordingly, it is an object of this invention to increase the resistance of such butadiene polymer and copolymer resins to deterioration by heat and air.

Another object is to provide such heat resistant resins which will have physical and chemical properties substantially undiminished in comparison with these resins as heretofore supplied.

A further object is to improve the heat resistance of such resins by incorporating therein modest amounts of compounding ingredients which are readily available, and which present no dangers or inconvenience involving toxicity, corrosiveness or the like.

SUMMARY OF THE INVENTION

The above and other objects are secured, in accordance with this invention in compositions comprising:

|  | Parts by Weight |
|---|---|
| Butadiene homopolymer or copolymer resin | 100 |
| Bis(dihydrocarbyl)thionophosphonato)polysulfide* | 0.5 – 5.0 |
| A metal soap | 0.5 – 5.0 |

* The polysulfide is a di-, tri-, or tetra-sulfide.

The composition is cured by heating with the presence of:

An organic peroxide curing agent 0.5–6.0

The above ingredients are, of course, exclusive of other filling, reinforcing and compounding ingredients such as glass fiber, glass fabric, asbestos, flame resisters, and the like which may be used.

DESCRIPTION OF THE PREFERRED EMBODIMENTS

The Polybutadiene Resins

The resins are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. The resins have at least 40%, and preferably at least 60% by weight, of butadiene in the polymer molecule, and have at least 80% by weight of the butadiene therein in the vinyl type of butadiene repeating unit structure. These resins are usually prepared by (co)polymerizing the monomers by means of free radical or anionic catalysts to a relatively low molecular weight, say 1,000–200,000, so that they are of at least a flowable consistence. These low molecular weight (co)polymers are then incorporated with any desired fillers, reinforcing fibers or fabrics, pigments, etc., peroxide or other curing agents if desired, etc., and the composite is cured under heat and pressure to produce the desired finished article.

The average molecular weight of the resins (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration.

These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO\cdot$ where R independently in each occurrence represents a hydrocarbon radical of 1–20 carbon atoms), and heating the polymers, usually under pressure. The curing temperature is advantageously at least 250°F. (121°C.), preferably about 300–350°F. (149°–177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than 4 minutes, and in some cases even within a few seconds. Cure times of more than 4 minutes usually provide no added advantage. Where fast cures are desired, it is necessary to use a filler to avoid crazing or cracking.

A filler, such as silica, is advantageously used in the proportion of 25–65, preferably 40–60, volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions. Calcium stearate is usually preferred.

Bis(Dihydrocarbylthionophosphonato)Di-, Tri- And Tetrasulfides

The bis(dihydrocarbylthionophosphonato)polysulfides may be represented by the following formula:

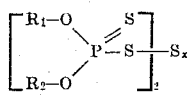

in which $R_1$ and $R_2$ represent hydrocarbyl groups which may be alkyl groups containing from one to about eight or more carbon atoms or aryl groups containing from about 12 to 16 carbon atoms. The value of $x$ may vary from zero to two. Values of $x$ greater than two generally represent compounds which tend to eliminate elemental sulfur and revert to di-, tri- or tetrasulfides.

The $R_1$ and $R_2$ groups may be the same or different. Because of the ease of preparation, compounds in which $R_1$ and $R_2$ are the same are preferred.

The carbon atoms of the hydrocarbyl groups may be alkyl arranged in a linear, branched or cyclic configuration as well as aromatic rings or any combination of these structures.

Representative linear and branched alkyl compounds which are useful as stabilizers are:
bis(diethylthionophosphonato)disulfide,
bis(diethylthionophosphonato)trisulfide,
bis(diethylthionophosphonato)tetrasulfide,
bis(diisopropylthionophosphonato)disulfide,
bis(diisopropylthionophosphonato)trisulfide,
bis(diisopropylthionophosphonato)tetrasulfide,
bis(dioctylthionophosphonato)polysulfides, etc.

Cyclic alkyl compounds include:
bis(dicyclopentylthionophosphonato)disulfide,
bis(dicyclopentylthionophosphonato)trisulfide,
bis(dicyclopentylthionophosphonato)tetrasulfide,
bis(dicyclohexylthionophosphonato)disulfide,
bis(dicyclohexylthionophosphonato)trisulfide,
bis(dicyclohexylthionophosphonato)tetrasulfide,
etc.

Aromatic derivatives such as the following are representative of useful compounds:
bis(diphenylthionophosphonato)disulfide,
bis(diphenylthionophosphonato)trisulfide,
bis(diphenylthionophosphonato)tetrasulfide,
bis(dicresylthionophosphonato)disulfide,
bis(dicresylthionophosphonato)trisulfide,
bis(dicresylthionophosphonato)tetrasulfide,
bis(dinaphthylthionophosphonato)polysulfides,
and the like.

Preparation of the Bis(dihydrocarbylthionophosphonato)Polysulfides

Trisulfides: These compounds are relatively easily prepared by reacting alcohols with phosphorus pentasulfide to form the corresponding 0,0-dihydrocarbylphosphorodithioic acid and forming the potassium salt of the acid by reaction with potassium hydroxide or potassium carbonate. The potassium salt is then reacted with sulfur dichloride to form the trisulfide. The reactions may be illustrated as follows:

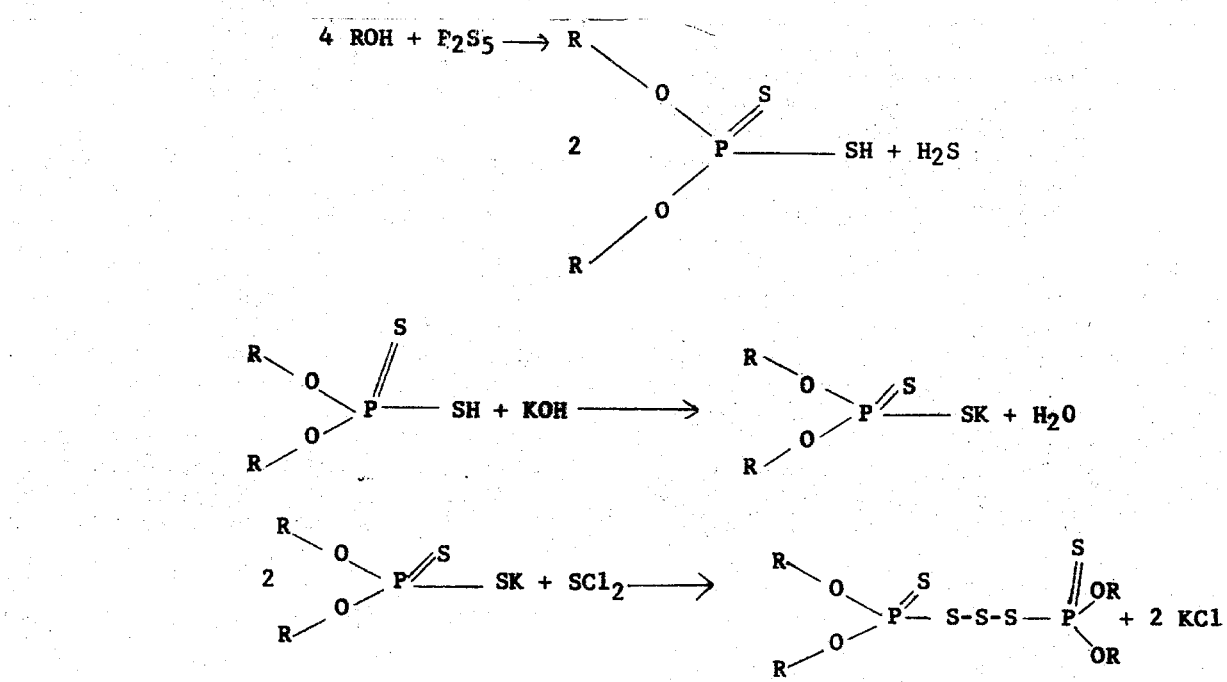

A detailed description of the preparation of bis(diethylthionophosphonato) trisulfide is summarized in the following.

Preparation of Bis(diethylthionophosphonato)trisulfide

Absolute ethanol (300 ml) and phosphorus pentasulfide (44.4 g.) were stirred under a nitrogen sweep until all of the phosphorus pentasulfide had reacted and the solution became free of hydrogen sulfide. Excess potassium carbonate (55 g) was added in portions, and when the evolution of carbon dioxide had ceased, the reaction mixture was filtered. The excess ethanol was removed on a rotary evaporator leaving 77.5 of white solid, m.p. 195°–197°C., which gave elemental analysis in agreement for that for the desired potassium 0,0-diethylphosphorodithioate.

20.8 g (0.09 mole) of the above product was dissolved in 200 ml tetrahydrofuran; to this solution there was added dropwise a solution of 5.2 g (0.05 mole) of sulfur dichloride in 25 ml tetrahydrofuran. The mixture was filtered to remove the potassium chloride. Removal of the solvent left 18.8 g of a yellow oil which soon crystallized. The solid was recrystallized from hexane to give white crystals, m.p. 71°–73°C.

Tetrasulfides: These compounds are prepared in a manner analogous to the trisulfides except that the potassium 0,0-dihydrocarbylphosphorodithioate is reacted with sulfur monochloride, as shown below, to form the tetrasulfide.

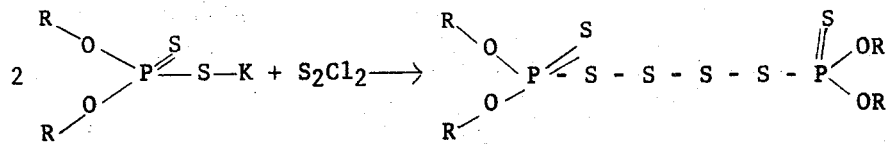

+ 2 KCl

A detailed summary of the preparation of bis(diethylthionophosphonato)tetrasulfide follows.

Preparation of Bis(diethylthionophosphonato)tetrasulfide

To a solution of 66.6 g (0.3 mole) of potasdsium 0,0-diethylphosphorodithioate in 600 ml tetrahydrofuran there was added dropwise a solution of 20.4 g (0.15 mole) of sulfur monochloride in 100 ml tetrahydrofuran. The mixture was filtered to remove potassium chloride. Removal of the solvent left 51.6 g of a yellow oil. The mass spectrum confirmed the identity of the desired product.

References: Chemical Abstracts 46:60806.

Bis(diisopropylphosphonato)disulfide

Bis(diisopropylphosphonato) disulfide is a commercial product obtainable from E. I. du Pont de Nemours and Company.

The Cured Resins

The cured resins produced in accordance with this invention have exceptional resistance to thermooxidative deterioration of physical properties, particularly modulus and flexural strength upon long time exposure at high temperatures, i.e., temperatures above 400°F. and up to 700°F. Thus, the products, upon exposure to a temperature of 600°F. for 100 hours, will retain upwards of 80% of their modulus and upwards of 80% of their flexural strength. The resins are therefore applicable in many situations where heat exposure is a factor, as in structural electrical components, cooking utensil handles, and automobile engine compartment components.

With the foregoing general discussion in mind, there is given herewith a detailed experimental example of the practice of this invention in which any of the polysulfides may be used. All parts and percentages given are on the basis of weight, unless otherwise explicitly stated.

EXAMPLE I

| | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium stearate | (per Table I) |
| Bis(dihydrocarbylthionophosphonato) polysulfide | (per Table I) |

* 90% of butadiene units in 1,2-configuration; molecular weight parameters $M_w$ = 29,000, $M_n$ = 23,000, DSV = 0.3.

A composition was made up in accordance with the above schedule, varying the calcium stearate and the polysulfide as indicated in the following table. In the case of each composition, the ingredients, in the proportions selected for that composition, were thoroughly mixed together, and the mixture poured into an evaporating dish to the depth of 0.5 inch. The dish was then placed in a vacuum oven, where the hexane was removed at 125°F. under a pressure of 1–5 mm. of mercury absolute. Each such dried composition was then removed and broken up, and molded in a compression mold into several test bars 1 inch × 3 inches × 0.1 inch. Temperature of molding was 350°F., total load on the die was 10–20 tons normal to the 1 inch × 3 inch face, and time was 4 minutes. The modulus and flexural strength was determined upon control bars from each composition, and the average recorded in the table.

The use of hexane in the mixture was a matter of convenience in preparing relatively small laboratory samples. On an industrial scale, hexane may be omitted as a matter of economics and the remaining components of the mixture dry-blended by known commercial means.

EVALUATION OF THE POLYSULFIDES

As a matter of brevity, the following symbols are used to identify the stabilizers.

| Stabilizer A: | bis(diethylthionophosphonato) trisulfide |
|---|---|
| Stabilizer B: | bis(diethylthionophosphonato) tetrasulfide |
| Stabilizer C: | bis(diisopropylthionophosphonato) disulfide |
| Stabilizer D: | bis(diisopropylthionophosphonato) trisulfide |
| Stabilizer E: | bis(diisopropylthionophosphonato) tetrasulfide |

TABLE I

STABILIZING EFFECT OF
BIS(DIHYDROCARBYLTHIONOPHOSPHONATO)
POLYSULFIDES

Forced-Air Oven Aging at 600°F., 100 Hours

| TEST SPECIMEN | | FLEXURAL MODULUS psi $\times 10^{-6}$ | | | FLEXURAL STRENGTH, psi | | |
|---|---|---|---|---|---|---|---|
| | | Unaged | Aged | % Retained | Unaged | Aged | % Retained |
| 1. | Control | 1.31 | 1.25 | 96 | 11,100 | 1,100 | 10 |
| 2. | Control + 3.0 phr Ca Stearate | 1.40 | 1.10 | 79 | 10,700 | 7,200 | 67 |
| | Control + 3.0 phr Ca Stearate and Polysulfide, as follows: | | | | | | |
| 3. | A: 1.0 phr | 1.39 | 1.38 | 99 | 11,600 | 11,100 | 96 |
| 4. | B: 1.0 phr | 1.33 | 1.61 | 121 | 11,800 | 11,700 | 99 |
| 5. | B: 2.0 phr | 1.22 | 1.67 | 137 | 12,400 | 11,700 | 94 |
| 6. | C: 0.5 phr | 1.56 | 1.36 | 87 | 12,200 | 9,600 | 79 |
| 7. | C: 1.0 phr | 1.47 | 1.39 | 95 | 12,400 | 9,900 | 80 |
| 8. | D: 1.0 phr | 1.39 | 1.55 | 111 | 10,800 | 11,000 | 102 |
| 9. | D: 2.0 phr | 1.30 | 1.64 | 126 | 12,500 | 12,400 | 99 |
| 10. | E: 1.0 phr | 1.12 | 1.43 | 128 | 10,600 | 9,900 | 94 |
| 11. | E: 2.0 phr | 1.08 | 1.53 | 142 | 10,200 | 12,200 | 120 |

In Table I we have included an unstabilized control (Test Specimen 1) as a point of reference. Test Specimen 2, which contained 3.0 phr of calcium stearate, was included because we have also determined that calcium stearate does effect some stabilization of the polybutadiene resins as herein defined.

As shown by the data in Table I, all of the bis(dihydrocarbylthionophosphonato) polysulfides of our invention effected a higher flexural modulus and strength retention after aging 100 hours at 600°F. than either Test Specimen 1 or 2.

Specifically, Test Specimen No. 3 which contained 1.0 phr of Stabilizer A which is bis(diethylthionophosphonato)trisulfide had an aged flexural strength of 11,100 psi as compared to 1,100 psi and 7,200 psi for the controls, i.e., Test Specimen Nos. 1 and 2, respectively.

Stabilizer B which is bis(diethylthionophosphonato) tetrasulfide also effected a high retention of flexural strength in Test Specimens 4 and 5. The effect of higher concentration of the tetrasulfide is shown in the higher percentage of retained modulus value for Test Specimen 5 as compared to Test Specimen 4.

The effectiveness of a disulfide is shown by the data obtained on Test Specimens 6 and 7 which contained bis(diisopropylthionophosphonato) disulfide.

Data on Test Specimen Nos. 8 through 11 again indicate the general effectiveness of bis(diisopropylthionophosphonato) tri- and tetrasulfides as stabilizers against thermo-oxidative degradation of the polybutadiene resins as herein defined.

What is claimed is:

1. Process of producing a resin having a high resistance to thermo-oxidative deterioration of its mechanical properties, which process comprises subjecting to curing at 250° to 420°F. a composition containing

| | Parts by Weight |
|---|---|
| A butadiene homopolymer or copolymer resin | 100 |
| Bis(dihydrocarbylthionophosphonato) di-, tri- or tetrasulfide | 0.5 – 5.0 |
| Calcium stearate | 0.5 – 5.0 |
| A peroxide curing agent | 0.5 – 6.0 |
| Silica | 100 to 500 |
| Vinyl triacetoxysilane | 0.05 – 5.0 | the resin being a homopolymer of butadiene or a copolymer of butadiene and styrene and containing at least 40% by weight of butadiene, and at least 80% of butadiene repeating units in the homopolymer or copolymer being in the 1,2-configuration; the curing agent being a peroxide which gives radicals of the structure $R_2(CH_3)O$. in which each R represents a hydrocarbon radical of one to 20 carbon atoms, and each hydrocarbyl group being from the class consisting of alkyl groups containing one to eight carbon atoms and aryl groups containing 12 to 16 carbon atoms.

2. A composition curable to a hard resin having enhanced resistance to thermo-oxidative deterioration of its mechanical properties, said composition containing

|  | Parts by Weight |
|---|---|
| A butadiene polymer or copolymer resin | 100 |
| Bis(dihydrocarbylthionophosphonato) di-, tri- or tetrasulfide | 0.5 – 5.0 |
| Calcium stearate | 0.5 – 5.0 |
| A peroxide curing agent | 0.5 – 6.0 |
| Silica | 100 – 500 |
| Vinyl triacetoxysilane | 0.5 – 5.0 | the resin being a homopolymer of butadiene or a copolymer of butadiene and styrene and containing at least 40% by weight of butadiene, and at least 80% of butadiene repeating units in the homopolymer or copolymer being in the 1,2-configuration; the curing agent being a peroxide which gives radicals of the structure $R_2(CH_3)O$. in which each R represents a hydrocarbon radical of one to 20 carbon atoms, and each hydrocarbyl group being from the class consisting of alkyl groups containing one to eight carbon atoms and aryl groups containing 12 to 16 carbon atoms.

3. A peroxide-cured resin highly resistant to thermooxidative deterioration of physical properties, said resin containing therein

|  | Parts by Weight |
|---|---|
| A butadiene polymer or copolymer resin | 100 |
| Bis(dihydrocarbylthionophosphonato) di-, tri- or tetrasulfide | 0.5 – 5.0 |
| Calcium stearate | 0.5 – 5.0 |
| Silica | 100 – 500 |
| Vinyl triacetoxysilane | 0.05 – 5.0 | the resin being a homopolymer of butadiene or a copolymer of butadiene and styrene and containing at least 40% by weight of butadiene, and at least 80% of butadiene repeating units in the homopolymer or copolymer being in the 1,2-configuration; and each hydrocarbyl group being from the class consisting of alkyl groups containing one to eight carbon atoms and aryl groups containing 12 to 16 carbon atoms.

4. The process of claim 1 in which the polysulfide is a bis(dialkylthionophosphonato) polysulfide in which each alkyl group contains one to eight carbon atoms.

5. The composition of claim 2 in which the polysulfide is a bis(dialkylthionophosphonato) polysulfide in which each alkyl group contains one to eight carbon atoms.

6. The composition of claim 3 in which the polysulfide is a bis(dialkylthionophosphonato) polysulfide in which each alkyl group contains one to eight carbon atoms.

7. The process of claim 1 in which the resin is cured at 300°–350° F.

* * * * *

PO-1050
(5/69)

UNITED STATES PATENT OFFICE
CERTIFICATE OF CORRECTION

Patent No. 3,852,229            Dated December 3, 1974

Inventor(s) Delmar F. Lohr, Jr. and Edward L. Kay

It is certified that error appears in the above-identified patent and that said Letters Patent are hereby corrected as shown below:

In Column 5, Line 44, "potasdsium" should be --potassium--

In Table I, Item 11. E, "10.200 and 12.200" should be --10,200 and 12,200 --

Signed and sealed this 4th day of March 1975.

(SEAL)
Attest:

RUTH C. MASON
Attesting Officer

C. MARSHALL DANN
Commissioner of Patents
and Trademarks